March 5, 1929. C. S. PINKERTON 1,704,101
METHOD OF AND APPARATUS FOR CONTROLLING THE QUALITY OR
TOTAL HEATING VALUE OF A FLOWING MIXTURE OF FLUIDS
Filed April 22, 1926
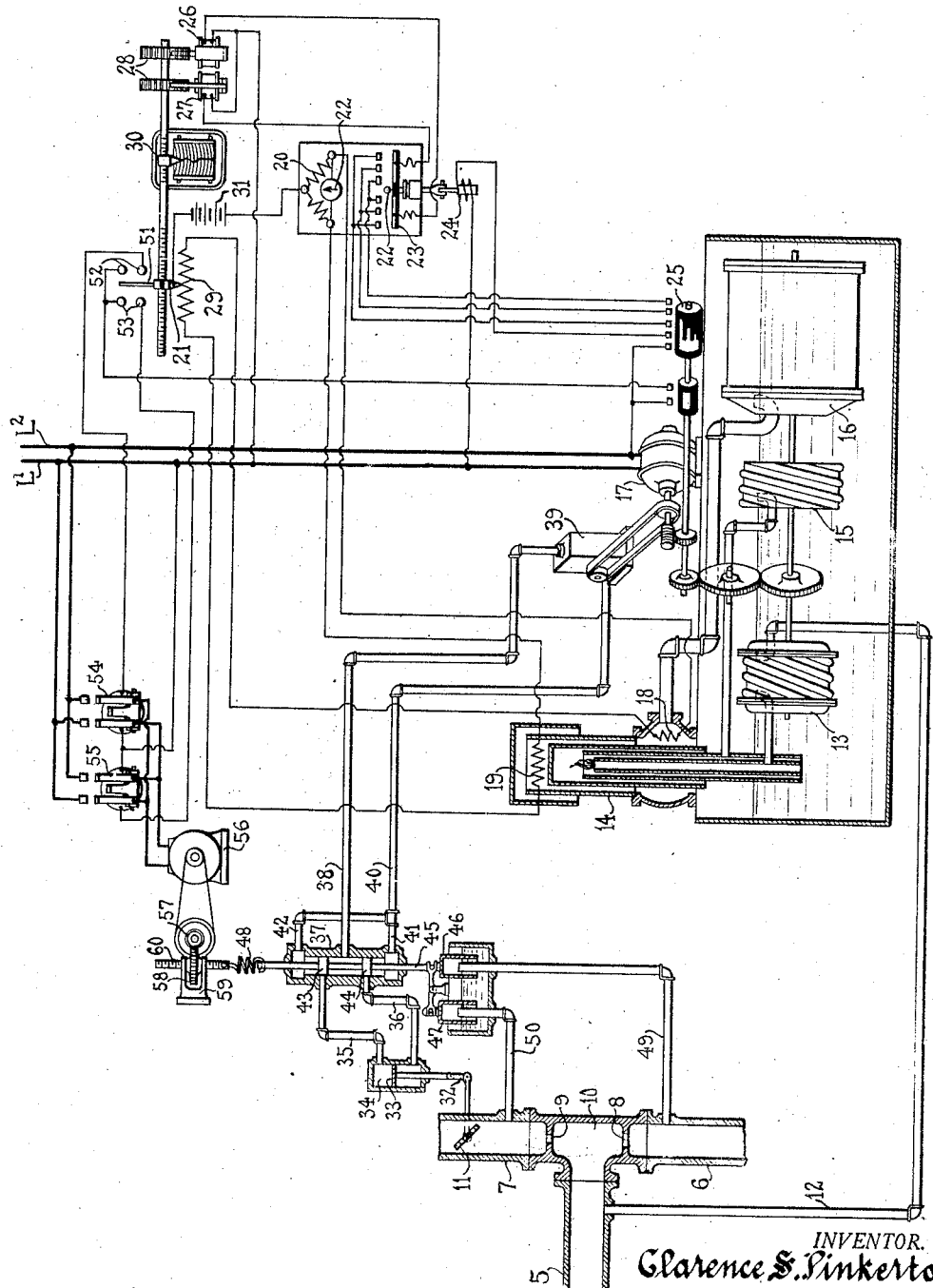

Patented Mar. 5, 1929.

1,704,101

UNITED STATES PATENT OFFICE.

CLARENCE S. PINKERTON, OF MILWAUKEE, WISCONSIN, ASSIGNOR TO THE CUTLER-HAMMER MFG. CO., OF MILWAUKEE, WISCONSIN, A CORPORATION OF WISCONSIN.

METHOD OF AND APPARATUS FOR CONTROLLING THE QUALITY OR TOTAL HEATING VALUE OF A FLOWING MIXTURE OF FLUIDS.

Application filed April 22, 1926. Serial No. 103,763.

This invention relates to improvements in methods of and apparatus for controlling the quality or total heating value of a flowing mixture of fluids.

More particularly, the invention relates to improvements in methods and apparatus of the character disclosed in the copending application of R. H. Kruse, Serial No. 571,018, filed June 26, 1922.

An object of the invention is to provide a novel method of maintaining a substantially constant total heating value of a mixture of combustible fluids under conditions of large and rapid variations in the demand for the combustible mixture.

Another object is to provide a method of the above character whereby variations in the rate of flow of one of the combustible fluids effects substantially instantaneous proportional variations in the rate of flow of the other combustible fluid to thereby maintain substantially constant the total heating value of the mixture.

Another object is to provide such a method wherein a finer adjustment of the relative rates of flow of the combustible fluids may be effected in accordance with the combustion calorific value of the mixture thereof.

Another object is to provide apparatus for enactment of the foregoing methods.

Other objects and advantages of the invention will hereinafter appear.

In most cities, and for many industrial purposes, it is required that gas of substantially constant gross or total heating value be supplied. Ordinarily, the heating value of the gas is controlled by mixing two gases which may have widely different qualities, such as natural gas of 1000 B. t. u. per cubic foot and producer gas of 150 B. t. u. per cubic foot. Heretofore (as in the Kruse application aforenoted) it has been customary to control the relative proportions of the gases in the mixture in accordance with the determinations of a suitable calorimeter burning a sample of the mixture. A controller of the type aforementioned is necessarily slow in operation, since there may be a time lag of several minutes before the effect of any change is registered. Such an arrangement is, of course, satisfactory where the changes occur slowly or gradually. In many cases, however, the gas flow changes rapidly, due to changes in the demand for gas, and it is then essential to make quick changes in the relative rates of flow of the two streams of gas in order to maintain the correct mixture.

The accompanying drawing, consisting of a single figure, illustrates schematically and diagrammatically one form of device for accomplishment of the desirable results aforementioned, and the device will now be described, it being understood that various changes may be made in the details thereof without departing from my invention as defined in the appended claims.

In the drawing the numeral 5 designates a pipe adapted to conduct to the desired point or points of use a mixture of the gases supplied through the respective pipes 6 and 7, said gases being of different quality or combustion calorific value. Pipes 6 and 7 are adapted to discharge through orifices 8 and 9, respectively, into a suitable chamber 10 leading to pipe 5, said orifices being proportioned with respect to each other in accordance with the approximate heating value of the respective gases to provide a mixture of the desired heating value. With the foregoing arrangement, obviously the outlet pressures at the two orifices 8 and 9 will always be equal. Thus, if the demand for the mixture of gases flowing through pipe 5 remained constant and if the heating values of the respective gases flowing through pipes 6 and 7 remained constant a substantially constant heating value of the mixture could be maintained by the means just described. However, in practice either or both of the gases in the respective pipes 6 and 7 may be subject to rather wide variations in heating value, thereby tending to vary the heating value of the mixture passing through pipe 5. Such changes or variations in heating value of the respective gases ordinarily take place rather slowly or gradually, and the means now to be described are adapted to compensate for such variations whereby the heating value of the mixture is maintained substantially constant.

Said means may comprise elements constructed and adapted to function substantially in the manner disclosed in the aforementioned Kruse application. Thus, I preferably employ a suitable form of valve 11 adapted to control the rate of flow of gas through pipe 7. It will be understood, however, that said valve or such a valve might also be provided for controlling the rate of flow of gas through pipe 6. Valve 11 is adapted to be automatically operated to regulate the rate of supply of one of the gases relative to the other whereby the mixture flowing through pipe 5 is maintained of constant heating value per unit volume. Accordingly pipe 5 is tapped to permit withdrawal of a continuous sample of the mixture through a suitable conduit 12. Conduit 12 leads to the intake of a suitable wet displacement pump 13,—the latter being adapted to supply the sample to the burner of a calorimeter indicated generally at 14, additional wet displacement pumps 15 and 16 being provided for respectively supplying the calorimeter with combustion air and cooling air. Pumps 13, 15 and 16 may be driven by a common motor 17, whereas by the arrangement illustrated the test gas, combustion air and cooling air are supplied in predetermined proportions under like conditions of temperature, pressure and saturation.

Resistance thermometers 18 and 19 are arranged in the stream of cooling air to be subjected respectively to the temperature of the latter before and after the heat transfer, said resistance thermometers, being connected in a Wheatstone bridge, indicated at 20, having associated devices arranged to be influenced thereby for operating suitable instrumentalities including a member 21 adapted to be moved in a direction and to a degree corresponding with the character and value of any variations in total heating value of the test gas.

The instrumentalities directly controllable by the Wheatstone bridge may preferably include a galvanometer needle 22 having associated therewith a switch 23 having an operating solenoid 24 which serves in conjunction with a contact drum 25 driven by motor 17 to control the operating electromagnets 26 and 27 of a ratcheting mechanism 28. Said ratcheting mechanism in turn is utilized to move the member 21 for varying the resistance of an adjusting rheostat 29 connected in the Wheatstone bridge to restore the balance of the latter following unbalancing thereof due to variation in the total heating value of the fluid in conduit 5. A recorder 30 may also be connected with the driven member of said ratcheting mechanism, if desired.

In practice the motor 17 together with the Wheatstone bridge and the various operating coils may all be supplied from a common source of direct current, although in the construction illustrated the Wheatstone bridge is indicated as supplied with direct current from a battery 31, the other instrumentalities being supplied from a separate source of current indicated at lines $L^1$, $L^2$.

The aforedescribed elements comprise the essentials of a standard type of calorimeter and hence warrant no more extended description herein.

As shown, valve 11 is connected through suitable lever mechanism 32 with a piston 33 operating within a cylinder 34, the opposite ends of said cylinder being connected by means of pipes 35 and 36 with longitudinally spaced points of a slide valve cylinder 37. A fluid pressure pipe 38 leads into cylinder 37 intermediate pipes 35 and 36, the other end of pipe 38 being connected to the discharge side of a suitable oil pump 39, also driven by motor 17, whereas the inlet side of said pump is connected by means of a common pipe 40 and branch pipes 41 and 42 with the opposite ends of cylinder 37. Jointly slidable within cylinder 37 is a pair of spaced pistons or blocks 43 and 44 adapted to selectively control communication between pipe 38 and pipes 35 and 36 leading to the upper and lower ends of cylinder 34.

Movement of blocks 43 and 44 from the neutral position illustrated is effected and controlled by connection of the piston rod 45 at one end to a pair of balanced differential pressure floats 46 and 47 and at the other end to an adjustable tension spring 48. The interior of pressure float 46 communicates with pipe 6 by means of pipe 49, that is, on the upstream side of orifice 8, whereas the interior of pressure float 47 communicates with pipe 7 by means of pipe 50, on the upstream side of orifice 9. Thus assuming a proper adjustment of the tension of spring 48, with a consequent adjustment of the degree of opening of valve 11 to provide a gas mixture in pipe 5 of predetemined total heating value, the pressure drop across orifices 8 and 9 will be proportional, thereby permitting the blocks 43 and 44 to remain in the neutral position illustrated.

However, upon a predetermined variation (either an increase or a decrease) in the total heating value of the combustible mixture passing through pipe 5, as measured by the calorimeter in the manner aforedescribed, a bridging contactor 51 carried by the member 21 is brought into engagement with one or the other of two pairs of contacts 52 and 53. Said pairs of contacts are adapted to respectively control the energizing circuit of reversing switches 54 and 55, whereby an electric motor 56 or the like may be connected to lines $L^1$, $L^2$ for operation thereof in one direction or the other to increase or decrease the tension of spring 48. Said tension varying means may comprise a worm 57, having suitable connection with the motor and meshing with a gear 58 supported in bearing bracket 59. Gear 58 is provided with a concentric threaded opening adapted to receive a threaded rod 60 for effecting upward or downward movement of the latter in accordance with the direction of rotation of said gear. Spring 48 is connected to the lower end of rod 60, whereby the controlling effect of pressure floats 46 and 47 upon the position of blocks 43 and 44 is modified.

Thus if the total heating value of the mixture passing through pipe 5 decreases from the predetermined value due to a decrease in the total heating value of the gas supplied from pipe 6, the effect of such decrease is relayed by means of the calorimeter and its associated elements to cause bridging contactor 51 to engage contacts 53, thereby completing the energizing circuit of switch 55 to effect operation of motor 56 in a direction to cause lowering of rod 60 to decrease the tension of spring 48. Blocks 43 and 44 are thus lowered to effect communication between pipe 42 leading to the intake side of pump 39 and pipe 35 leading from the cylinder 34 above piston 33 and to also effect communication between pipe 38 leading from the discharge side of pump 39 and pipe 36 leading to the cylinder 34 below piston 33. Piston 33 will thereupon be moved upwardly to effect closing movement of valve 11, the degree of closure of valve 11 being proportional to the decrease in total heating value of the mixed gases, whereby the quantity of gas supplied through pipe 7 is proportioned with respect to the quantity passing through pipe 6 to provide a mixture of the desired total heating value.

In the above manner the device is adapted to compensate for gradual changes in the total heating value of the combustible mixture due to changes in the total heating value of one or more of the constituent gases. Obviously, however, if there is a rapid or sudden increase or decrease in the demand for the combustible mixture, such change would tend to vary the predetermined proportionality of the rates of flow of the gases through orifices 8 and 9. For example, if the demand for the combustible mixture were doubled, it is obvious that the rate of flow through orifice 9 would not be increased in proportion to the increased flow through orifice 8, due to the partially closed positioning of valve 11. However, valve 11 is additionally subjected to control by the pressure floats 46 and 47, which tend to maintain the pressure drop across orifice 9 proportional to the pressure drop across orifice 8; subject, however, to the existing tension upon spring 48 as effected by the determinations of the calorimeter, so that variations in the demand for the combustible mixture are substantially instantaneously compensated for. In this way the desired proportionality of the gas flows is insured under all conditions, whereas the gradual changes in the total heating value of the mixture are compensated for by the calorimeter and its associated elements in the manner aforedescribed.

I have thus provided a quick acting device for maintaining a constant quality or total heating value of a combustible mixture, whereby the inherent disadvantages of a device dependent solely upon the determinations of a relatively slow acting calorimeter are obviated.

What I claim and desire to secure by Letters Patent is:

1. The method of controlling the total heating value per unit volume of a flowing mixture of combustible gaseous fluids, which comprises supplying gaseous fluids of different heating values through fixed orifices proportioned respectively to provide a fluid mixture of predetermined heating value, varying the rate of supply of one of said fluids in accordance with the differential value of pressure conditions at the inlet sides of the respective orifices to thereby compensate for rapid variations in the relative rates of flow of the fluids, burning a sample flow of the mixture to ascertain the total heating value per unit volume of the latter, and additionally varying the rate of supply of said one of said fluids in accordance with the ascertained value to thereby maintain the total heating value per unit volume of the mixture substantially constant.

2. A device for controlling the total heating value per unit volume of a flow of combustible fluid, comprising means for supplying from separate sources the constituents of said flow, a mixing chamber having proportioned fixed orifices through which said constituents are adapted to flow to normally provide a mixture of predetermined total heating value, means for automatically varying the rate of flow of one of said constituents in accordance with variations in the rate of flow of another of the same to thereby maintain said total heating value of the mixture, said means comprising differentially related pressure responsive devices respectively subjected to pressure conditions on the upstream sides of said orifices, and a valve controlled by the differential action of said devices, said valve being adapted to regulate the rate of flow of one of said constituents.

3. Apparatus for controlling the flow of a combustible fluid constituent of a composite flow of combustible fluid, comprising a combustion calorimeter for determining the total heating value per unit volume of said composite flow, means for subjecting the rate of said constituent combustible flow to control in accordance with the determinations of said calorimeter, and complementary means for subjecting the rate of said constituent combustible flow to control in accordance with variations in the rate of flow of another combustible fluid.

4. Apparatus for controlling the flow of a combustible fluid constituent of a composite flow of combustible fluid, comprising a combustion calorimeter for determining the total heating value per unit volume of said composite flow, means for subjecting the rate of said constituent combustible flow to control in accordance with the determinations of said calorimeter, and complementary means for subjecting the rate of said constituent combustible flow to control in accordance with variations in the rate of another constituent combustible flow, said means comprising a chamber having fixed orifices adapted to provide a predetermined proportionality of said constituent flows under conditions of predetermined pressures on the upstream sides of said orifices, a valve for regulating the pressure on the upstream side of one orifice, differentially connected pressure floats for effecting operation of said valve, and means for respectively subjecting said floats to pressure conditions on the upstream sides of said orifices.

5. In a device for controlling the relative rates of flow of combustible fluids of unlike quality to provide a flowing mixture thereof of predetermined total heating value per unit volume, the combination with a conduit for each of said combustible fluids, each of said last mentioned conduits having a fixed orifice through which the respective fluids are adapted to flow, a conduit for the mixture of said fluids, a calorimeter adapted to burn a continuous sample of said mixture of fluids, means for varying the rate of flow of one of said combustible fluids in accordance with the determinations of said calorimeter, and means for also varying the rate of flow of said combustible fluid in accordance with variations in relative values of the pressure drops across said orifices.

6. The method of maintaining substantially a given total heating value per unit volume of a composite flow of combustible gaseous fluid, which comprises burning a sample flow of the fluid of said composite flow in a manner to determine the total heating value per unit volume of the latter, regulating the rate of flow of one of the combustible constituents of said composite flow in accordance with the value so determined, and modifying the regulation so effected to compensate for variations in the relative rate of flow of another of the combustible constituents of said composite flow.

In witness whereof, I have hereunto subscribed my name.

CLARENCE S. PINKERTON.